(12) United States Patent
Kunai

(10) Patent No.: US 9,039,860 B2
(45) Date of Patent: *May 26, 2015

(54) METHOD OF MANUFACTURING POLARIZING PLATE

(75) Inventor: Yuichiro Kunai, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/581,913

(22) PCT Filed: Jan. 30, 2012

(86) PCT No.: PCT/JP2012/051973
§ 371 (c)(1),
(2), (4) Date: Oct. 24, 2012

(87) PCT Pub. No.: WO2013/114532
PCT Pub. Date: Aug. 8, 2013

(65) Prior Publication Data
US 2013/0192747 A1 Aug. 1, 2013

(51) Int. Cl.
*G02B 1/10* (2006.01)
*B32B 37/00* (2006.01)
*B32B 38/04* (2006.01)
(Continued)

(52) U.S. Cl.
CPC ............ *G02B 5/30* (2013.01); *G02F 1/133528* (2013.01); *G02B 5/3033* (2013.01); *G02B 5/3025* (2013.01)

(58) Field of Classification Search
CPC ...... G02B 5/3033; G02B 5/30; G02B 5/3025; G02F 1/133528
USPC .................. 156/229, 250, 256, 267
See application file for complete search history.

(56) References Cited

U.S. PATENT DOCUMENTS 4,659,523 A * 4/1987 Rogers et al. ................. 264/1.35
6,171,426 B1   1/2001 Blanchard
2007/0165157 A1* 7/2007 Hong .............................. 349/96
(Continued)

FOREIGN PATENT DOCUMENTS

JP 1-240517 A 9/1989
JP 3-14882 A 1/1991
(Continued)

OTHER PUBLICATIONS

International Search Report for PCT/JP2012/051973 dated Apr. 3, 2012.
(Continued)

*Primary Examiner* — John Goff
*Assistant Examiner* — Carson Gross
(74) *Attorney, Agent, or Firm* — Birch, Stewart, Kolasch & Birch, LLP

(57) ABSTRACT

The present invention is directed to a method of manufacturing a polarizing plate having a polarizer layer and a protection film, sequentially having a drawing step of uniaxially drawing a stack film constituted of a base film and a polyvinyl alcohol based resin layer, a removal step prior to bonding of removing by cutting, opposing first end portions in a direction of width after dyeing and cross-linking the resin layer of the stack film, and a bonding step of bonding a protection film on a surface opposite to a surface on a side of the base film of the polarizer layer in the stack film from which the first end portions were removed.

4 Claims, 4 Drawing Sheets

(51) Int. Cl.
*G02B 5/30* (2006.01)
*G02F 1/1335* (2006.01)

(56) References Cited

U.S. PATENT DOCUMENTS

| | | | |
|---|---|---|---|
| 2008/0192345 A1* | 8/2008 | Mochizuki et al. | 359/485 |
| 2010/0202051 A1 | 8/2010 | Yoshimi et al. | |
| 2010/0300611 A1 | 12/2010 | Yamamoto et al. | |
| 2013/0220525 A1 | 8/2013 | Kunai | |

FOREIGN PATENT DOCUMENTS

| | | | | | |
|---|---|---|---|---|---|
| JP | 3-122137 A | | 5/1991 | | |
| JP | 5-31424 A | | 2/1993 | | |
| JP | 7-171459 A | | 7/1995 | | |
| JP | 8-84953 A | | 4/1996 | | |
| JP | 2000-338329 A | | 12/2000 | | |
| JP | 2003-43257 A | | 2/2003 | | |
| JP | 2005-34681 A | | 2/2005 | | |
| JP | 2005034681 A | * | 2/2005 | ... | B05D 1/28 |
| JP | 2005-111669 A | | 4/2005 | | |
| JP | 2009-93074 A | | 4/2009 | | |
| JP | 2009-157359 A | | 7/2009 | | |
| JP | 2011-186085 A | | 9/2011 | | |
| JP | 2011-212550 A | | 10/2011 | | |
| KR | 10-2010-0071998 A | | 6/2010 | | |
| TW | 201202029 A1 | | 1/2012 | | |
| WO | WO 2011/125957 A1 | | 10/2011 | | |

OTHER PUBLICATIONS

English translation of WO-2011/125957-A1 dated Oct. 13, 2011.
The International Search Report, mailed on Jul. 5, 2011, issued in the corresponding International Application No. PCT/JP2011/058471.
The Office Action (including an English translation), dated Aug. 18, 2014, issued in the corresponding Korean Patent Application No. 10-2012-7019771.
The Office Action (including an English translation), dated Dec. 12, 2014, issued in the corresponding Korean Patent Application No. 10-2012-7019771.
Taiwanese Office Action and Search Report, dated Nov. 18, 2014, for Taiwanese Application No. 101127419, including an English translation of the Office Action.
The First Office Action (including an English translation), dated Oct. 30, 2014, issued in the corresponding Chinese Patent Application No. 201280000603.0.
The Office Action (including an English translation), dated Apr. 13, 2015, issued in the corresponding Korean Patent Application No. 10-2012-7019771.

* cited by examiner

FIG.2
(a)
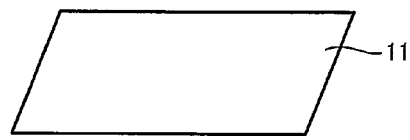
↓ STACKING STEP (S10)
(b)
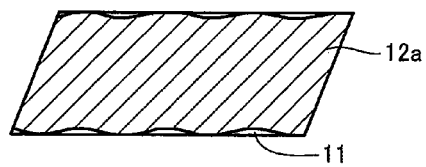
↓ DRAWING STEP (S20)
↓ DYEING STEP (S30)
↓ CROSS-LINKING STEP (S40)
(c)
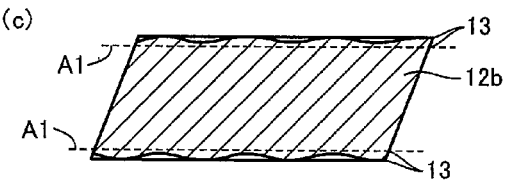
↓ REMOVAL STEP PRIOR TO BONDING (S50)
(d)
↓ BONDING STEP (S60)

FIG.3
(a)
↓ STACKING STEP (S10)
(b)
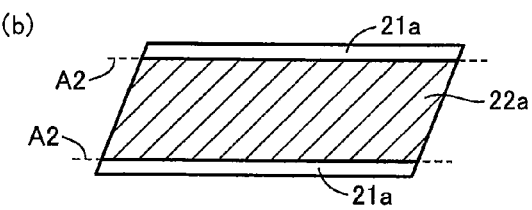
↓ DRAWING STEP (S20)
↓ DYEING STEP (S30)
↓ CROSS-LINKING STEP (S40)
(c)
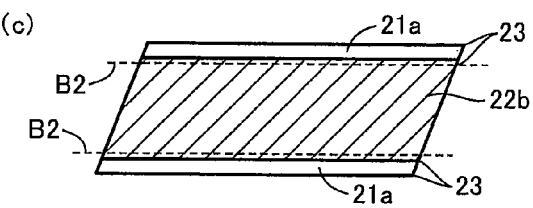
↓ REMOVAL STEP PRIOR TO BONDING (S50)
(d)
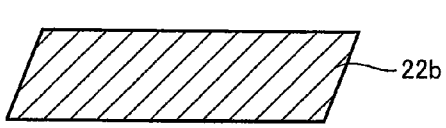
↓ BONDING STEP (S60)

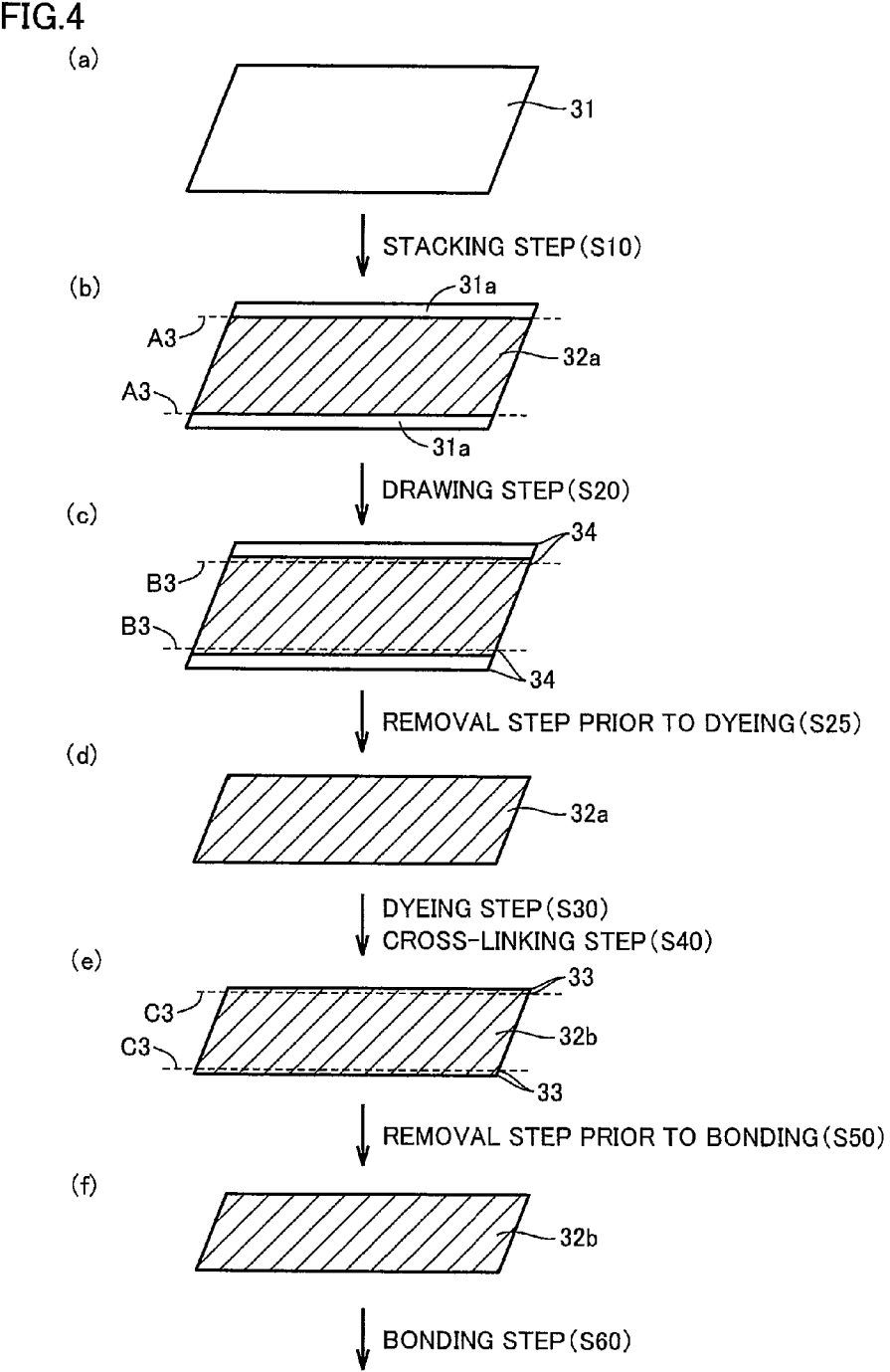

METHOD OF MANUFACTURING POLARIZING PLATE

TECHNICAL FIELD

The present invention relates to a method of manufacturing a polarizing plate.

BACKGROUND ART

A polarizing plate has widely been used as a polarization supply element or a polarization detection element in a liquid crystal display device. Conventionally, a polarizing plate obtained by adhering a protection film composed of triacetylcellulose to a polarization film composed of a polyvinyl alcohol based resin has been employed as such a polarizing plate. In recent years, however, smaller thickness and lighter weight have been demanded, with deployment of a liquid crystal display device to such mobile instruments as a notebook personal computer and a mobile phone, deployment thereof to a large-sized television, and the like.

As a method of manufacturing such a thin polarizing plate, a method of providing a resin layer by applying a solution containing a polyvinyl alcohol based resin to a surface of a base film, followed by drawing and dyeing, to thereby obtain a polarizing stack film having a polarizer layer, and making use of this polarizing stack film as the polarizing plate, and a method of bonding a protection film to the film, thereafter separating the base film, and making use of the resultant film as the polarizing plate have been proposed (see, for example, Japanese Patent Laying-Open No. 2000-338329 and Japanese Patent Laying-Open No. 2011-212550).

In addition, Japanese Patent Laying-Open No. 2011-212550 describes a method of providing an unapplied portion, to which a polyvinyl alcohol based resin solution is not applied, at each of opposing ends of a base film in order to prevent the opposing ends of the base film from rolling up in a drying step or the like after application of the solution containing the polyvinyl alcohol based resin to the surface of the base film. In this unapplied portion, such a defect as waving is likely during drawing or subsequent winding up. Therefore, the literature describes removal of the unapplied portion by cutting before or after the drawing step, in order to obtain a roll having good wound-up appearance.

CITATION LIST

Patent Literature

PTL 1: Japanese Patent Laying-Open No. 2000-338329
PTL 2: Japanese Patent Laying-Open No. 2011-212550

SUMMARY OF INVENTION

Technical Problem

In obtaining a stack film having a base film and a polarizer layer by carrying out drawing, dyeing, cross-linking, and the like after providing a polyvinyl alcohol based resin layer on a surface of the base film as in the conventional art described above, heat, tensile force, drawing force, or the like is applied to that stack film in those steps of dyeing, cross-linking, and the like, and waving or warp may be caused in an end portion thereof. Consequently, in bonding a protection film, creases or wrinkles may be caused in the end portion. Such creases or wrinkles cause, for example, partial accumulation of an adhesive. If drying of that portion is insufficient, such a defect as blue stain of a polarizer layer may be caused.

It is an object of the present invention to provide a method of manufacturing a polarizing plate, by obtaining a stack film by providing a polyvinyl alcohol based resin layer on a surface of a base film, followed by drawing, dyeing, cross-linking, and the like, and further bonding a protection film to the stack film, for suppressing production of creases or wrinkles in an end portion and suppressing blue stain of a polarizer layer.

Solution to Problem

The present invention includes the following.

[1] A method of manufacturing a polarizing plate having a polarizer layer and a protection film, the method comprising in this order, a stacking step of obtaining a stack film by forming a polyvinyl alcohol based resin layer on at least one surface of a base film, a drawing step of uniaxially drawing the stack film, a dyeing step of dyeing the polyvinyl alcohol based resin layer of the uniaxially drawn stack film with a dichromatic dye, a cross-linking step of forming a polarizer layer by immersing the polyvinyl alcohol based resin layer of the dyed stack film in a solution containing a cross-linker for cross-linking, a removal-prior-to-bonding step of cutting and removing, from said stack film having been cross-linked, its both first end portions located on opposite sides across its width, and a bonding step of bonding a protection film to a surface of said polarizer layer in said stack film from which the first end portions have been removed, the surface being opposite from the base film.

[2] The method described in [1], comprising a removal-prior-to-dyeing step of cutting and removing, from said stack film, its both second end portions located on opposite sides across its width, after the stacking step and before the dyeing step.

[3] The method described in [1] or [2], wherein in the stacking step, a third end portion where the polyvinyl alcohol based resin layer is not formed is provided at both end portions located on opposite sides across the width of the base film.

[4] The method described in [1], comprising a drying step of drying the polarizer layer after the cross-linking step and before the removal-prior-to-bonding step.

[5] The method described in [1], comprising a drying step of drying the polarizer layer after the removal-prior-to-bonding step and before the bonding step.

Advantageous Effects of Invention

According to the manufacturing method of the present invention, in manufacturing a polarizing plate by obtaining a stack film by providing a polyvinyl alcohol based resin layer on a surface of a base film, followed by drawing, dyeing, cross-linking, and the like of the film, and further bonding a protection film to the stack film, production of creases or wrinkles in an end portion at the time of bonding of the protection film can be suppressed and blue stain of a polarizer layer can be suppressed.

BRIEF DESCRIPTION OF DRAWINGS

FIG. 2 is a top perspective view schematically showing a stack film after each manufacturing step in the method of manufacturing a polarizing plate in a first embodiment.

FIG. 3 is a top perspective view schematically showing a stack film after each manufacturing step in the method of manufacturing a polarizing plate in a second embodiment.

FIG. 4 is a top perspective view schematically showing a stack film after each manufacturing step in the method of manufacturing a polarizing plate in a third embodiment.

DESCRIPTION OF EMBODIMENTS

Figure 1:
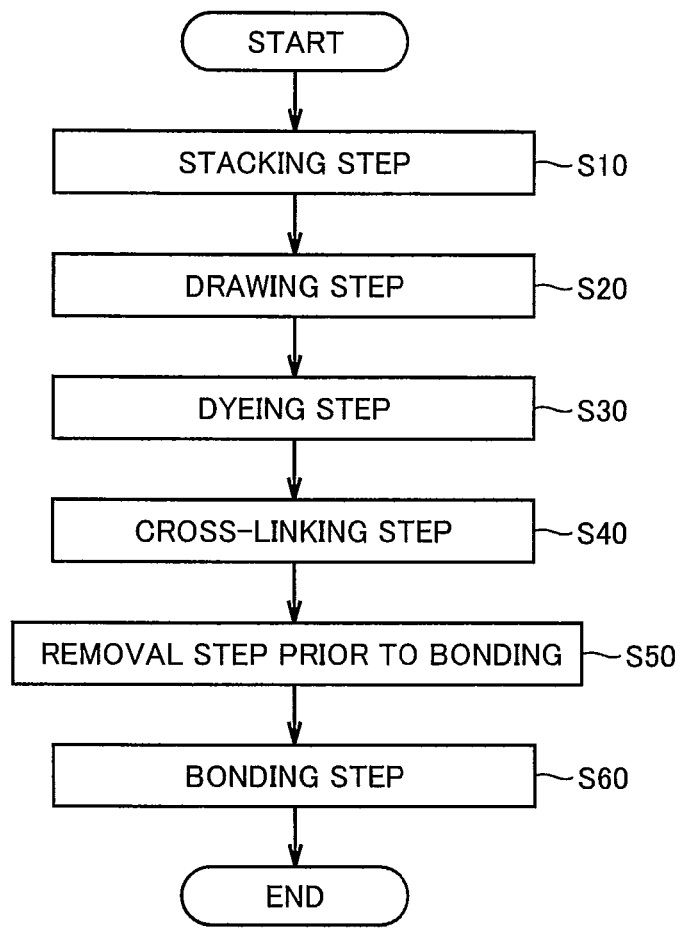
FIG. 1 is a flowchart showing a method of manufacturing a polarizing plate in the present invention.

FIG. 1 is a flowchart showing a method of manufacturing a polarizing plate in the present invention. The manufacturing method in the present invention is a method of manufacturing a polarizing plate, method comprising in this order, a stacking step (S10) of obtaining a stack film by forming a polyvinyl alcohol based resin layer on at least one surface of a base film, a drawing step (S20) of uniaxially drawing the stack film, a dyeing step (S30) of dyeing the polyvinyl alcohol based resin layer of the uniaxially drawn stack film with a dichromatic dye, a cross-linking step (S40) of forming a polarizer layer by immersing the polyvinyl alcohol based resin layer of the dyed stack film in a solution containing a cross-linker for cross-linking, a removal-prior-to-bonding step (S50) of cutting and removing, from said stack film having been cross-linked, its both first end portions located on opposite sides across its width, and a bonding step (S60) of bonding a protection film to a surface of said polarizer layer in said stack film from which the first end portions have been removed, wherein the surface is opposite from the base film.

The method may further have a separation step (S70) of separating the base film after the bonding step (S60). In the stacking step (S10), a polyvinyl alcohol based resin layer may be formed on each of opposing surfaces of the base film and a protection film may be bonded to each of the two polarizer layers in the bonding step (S60).

According to the manufacturing method of the present invention, since the method has the removal-prior-to-bonding step (S50), an end portion of the stack film where waving or warp has been caused by the time point of end of the cross-linking step (S40) can be removed. Therefore, in the bonding step (S60) of bonding a protection film to the stack film, production of creases and wrinkles in the end portion of the stack film and blue stain in the polarizer layer can be suppressed.

A preferred embodiment of a method of manufacturing a polarizing plate according to the present invention will be described hereinafter in detail with reference to the drawings.

[First Embodiment]

FIG. 2 is a top perspective view schematically showing a stack film after each manufacturing step in the method of manufacturing a polarizing plate in a first embodiment. Initially, as shown in FIG. 2(a), a base film 11 is prepared. Then, in the stacking step (S10), a polyvinyl alcohol based resin layer 12a is formed on one surface of the base film to thereby obtain a stack film shown in FIG. 2(b). Then, the stack film shown in FIG. 2(b) is subjected to the drawing step (S20), the dyeing step (S30), and the cross-linking step (S40), to thereby form a polarizer layer 12b from resin layer 12a and obtain a stack film shown in FIG. 2(c). Then, the stack film shown in FIG. 2(c) is subjected to the removal-prior-to-bonding step (S50) of removing its both end portions (first end portions) 13 located on opposite sides across its width which are regions outside a dotted line A1, by cutting along dotted line A1, to thereby obtain a stack film shown in FIG. 2(d). Thereafter, the bonding step (S60) of bonding a protection film to polarizer layer 12b is performed.

In FIG. 2(c), in the case where waving or warp is caused in an end portion of the stack film, a position of dotted line A1 is preferably determined such that each and every waving or warp is included in first end portion 13 outside dotted line A1. In addition, in the case where the end portion of the stack film includes a region where a polyvinyl alcohol based resin layer is not formed, a position of dotted line A1 is preferably determined such that the entire region where the polyvinyl alcohol based resin layer is not formed is included in first end portion 13 outside dotted line A1. Dotted line A1 defining a region of first end portion 13 is determined, for example, preferably in a region inside by not shorter than 0.5 cm and not longer than 20 cm from each of the ends located on opposite sides across the width of the stack film, more preferably in a region inside by not shorter than 1.0 cm and not longer than 15 cm, and further preferably in a region inside by not shorter than 1.5 cm and not longer than 10 cm.

[Second Embodiment]

FIG. 3 is a top perspective view schematically showing a stack film after each manufacturing step in the method of manufacturing a polarizing plate in a second embodiment. Initially, as shown in FIG. 3(a), a base film 21 is prepared. Then, in the stacking step (S10), a polyvinyl alcohol based resin layer 22a is formed on one surface of the base film to thereby obtain a stack film shown in FIG. 3(b). It is noted that a dotted line A2 is defined in advance in each of the end portions located on opposite sides across the width of base film 21 and a third end portion 21a where a polyvinyl alcohol based resin layer is not formed is provided in a region outside the same. By thus providing third end portion 21a where resin layer 22a is not formed, such a phenomenon that both ends of the base film warp toward resin layer 22a during drying of resin layer 22a can be suppressed. Resin layer 22a is formed by applying a solution containing a polyvinyl alcohol based resin, followed by drying. Dotted line A2 defining the region of third end portion 21a is determined preferably in a region inside by not shorter than 0.5 cm and not longer than 20 cm from each of the ends located on opposite sides across the width of the base film, more preferably in a region inside by not shorter than 1.0 cm and not longer than 15 cm, and further preferably in a region inside by not shorter than 1.5 cm and not longer than 10 cm.

Then, the stack film shown in FIG. 3(b) is subjected to the drawing step (S20), the dyeing step (S30), and the cross-linking step (S40), to thereby form a polarizer layer 22b from polyvinyl alcohol based resin layer 22a and obtain a stack film shown in FIG. 3(c). Then, the stack film shown in FIG. 3(c) is subjected to the removal-prior-to-bonding step (S50) of removing its both end portions (first end portions) 23 located on opposite sides across the width, which are regions outside a dotted line B2, by cutting along dotted line B2, to thereby obtain a stack film shown in FIG. 3(d). Thereafter, the bonding step (S60) of bonding a protection film to polarizer layer 22b is performed.

In FIG. 3(c), in the case where waving or warp is caused in an end portion of the stack film, a position of dotted line B2 is preferably determined such that each and every waving or warp is included in first end portion 23 outside dotted line B2. In addition, a position of dotted line B2 is preferably determined such that the entire region where the resin layer is not formed (third end portion 21a) is included in first end portion 23 outside dotted line B2. Dotted line B2 defining a region of first end portion 23 is determined, for example, preferably in a region inside by not shorter than 0.5 cm and not longer than 20 cm from each of the ends located on opposite sides across the width of the stack film, more preferably in a region inside by not shorter than 1.0 cm and not longer than 15 cm, and further preferably in a region inside by not shorter than 1.5 cm and not longer than 10 cm.

[Third Embodiment]

FIG. 4 is a top perspective view schematically showing a stack film after each manufacturing step in the method of manufacturing a polarizing plate in a third embodiment. Initially, as shown in FIG. 4(a), a base film 31 is prepared. Then, in the stacking step (S10), a resin layer 32a composed of a polyvinyl alcohol based resin is formed on one surface of the base film to thereby obtain a stack film shown in FIG. 4(b). It is noted that a dotted line A3 is defined in advance in each of the end portions located on opposite sides across the width of base film 31 and a third end portion 31a where a polyvinyl alcohol based resin layer is not formed is provided in a region outside the same. By thus providing third end portion 31a where resin layer 32a is not formed, such a phenomenon that both ends of the base film warp toward resin layer 32a during drying of resin layer 32a can be suppressed. Resin layer 32a is formed by applying a solution containing a polyvinyl alcohol based resin, followed by drying. Dotted line A3 defining the region of third end portion 31a is determined preferably in a region inside by not shorter than 0.5 cm and not longer than 20 cm from each of the ends located on opposite sides across the width of the base film, more preferably in a region inside by not shorter than 1.0 cm and not longer than 15 cm, and further preferably in a region inside by not shorter than 1.5 cm and not longer than 10 cm.

Then, the stack film shown in FIG. 4(b) is subjected to the drawing step (S20). Then, the stack film shown in FIG. 4(c), which is the drawn stack film, is subjected to a removal-prior-to-dyeing step (S25) of removing its both end portions (second end portions) 34 located on opposite sides across the width, which are regions outside a dotted line B3, by cutting along dotted line B3 to thereby obtain a stack film shown in FIG. 4(d). By having the removal-prior-to-dyeing step (S25), in the case where waving or warp has been caused in the end portion in the steps so far, that end portion can be removed and the drawn stack film can well be wound up. Therefore, production of creases or wrinkles in an end portion in a subsequent step can be prevented. Dotted line B3 defining the region of second end portion 34 is preferably determined such that the entire region where the resin layer is not formed (third end portion 31a) is included in second end portion 34 outside dotted line B3. Dotted line B3 defining second end portion 34 is determined preferably in a region inside by not shorter than 0.5 cm and not longer than 20 cm from each of the ends located on opposite sides across the width of the base film, more preferably in a region inside by not shorter than 1.0 cm and not longer than 15 cm, and further preferably in a region inside by not shorter than 1.5 cm and not longer than 10 cm. It is noted that the removal-prior-to-dyeing step (S25) is not limited to a manner performed after the drawing step (S20) as described above and it may be performed before the drawing step (S20).

Thereafter, the dyeing step (S30) and the cross-linking step (S40) are performed to thereby obtain a stack film shown in FIG. 4(e). Then, the dyed and cross-linked stack film shown in FIG. 4(e) is subjected to the removal-prior-to-bonding step (S50) of removing its both end portions (first end portions) 33 located on opposite sides across the width, which are regions outside a dotted line C3, by cutting along dotted line C3, to thereby obtain a stack film shown in FIG. 4(f). Thereafter, the bonding step (S60) of bonding a protection film to polarizer layer 32b is performed.

In the removal-prior-to-bonding step (S50) in the present embodiment, in the case where waving or warp is caused in an end portion in the dyeing step (S30) and the cross-linking step (S40), that end portion can be removed and production of creases and wrinkles in bonding a protection film can be prevented.

In FIG. 4(e), in the case where waving or warp is caused in an end portion of the stack film, a position of dotted line C3 is preferably determined such that each and every waving or warp is included in first end portion 33 outside dotted line C3. Dotted line C3 defining a region of first end portion 33 is determined, for example, preferably in a region inside by not shorter than 0.5 cm and not longer than 20 cm from each of the ends located on opposite sides across the width of the stack film, more preferably in a region inside by not shorter than 1.0 cm and not longer than 15 cm, and further preferably in a region inside by not shorter than 1.5 cm and not longer than 10 cm.

Though the embodiments of the present invention have been described above, the present invention is not limited to these embodiments, and for example, the steps in the embodiments above can be performed in combination. Each step common to all the embodiments will be described hereinafter in detail.

[Resin Layer Formation Step (S10)]

Here, a polyvinyl alcohol based resin layer is formed on at least one surface of a base film. A material suitable for a base film will be described later. It is noted that, in the present embodiment, a base film that can be drawn in a temperature range suitable for drawing of a polyvinyl alcohol based resin is preferably employed as the base film.

A formed resin layer preferably has a thickness greater than 3 μm and not greater than 30 μm, and further preferably a thickness from 5 to 20 μm. When the thickness is not greater than 3 μm, the resin layer becomes too thin after drawing and dyeing affinity becomes significantly poor. When the thickness exceeds 30 μm, a thickness of a finally obtained polarizer layer may exceed 10 μm.

The resin layer is preferably formed by coating one surface of a base film with a polyvinyl alcohol based resin solution obtained by dissolving powders of a polyvinyl alcohol based resin in a good solvent, followed by evaporation of the solvent and drying. By thus forming the resin layer, the resin layer can be formed to have a small thickness. As a method of coating a base film with a polyvinyl alcohol based resin solution, a method selected as appropriate from among known methods including a wire bar coating method, a roll coating method such as reverse coating and gravure coating, a dye coating method, a comma coating method, a lip coating method, a spin coating method, a screen coating method, a fountain coating method, a dipping method, a spraying method, and the like can be adopted. A drying temperature is set, for example, to 50 to 200° C. and preferably to 60 to 150° C. A drying time period is set, for example, to 2 to 20 minutes.

In addition, in order to improve adhesiveness between a base film and a polyvinyl alcohol based resin, a primer layer may be provided between the base film and the resin layer. The primer layer is preferably formed of a composition containing a cross-linker or the like in a polyvinyl alcohol based resin, from a point of view of adhesiveness.

(Base Film)

As a resin used for a base film, for example, a thermoplastic resin excellent in transparency, mechanical strength, thermal stability, and ductility is used, and an appropriate resin can be selected in accordance with a glass transition temperature (Tg) or a melting point (Tm) thereof. Specific examples of the thermoplastic resins include a polyolefin based resin, a polyester based resin, a cyclic polyolefin based resin (a norbornene based resin), a (meth)acryl based resin, a cellulose ester based resin, a polycarbonate based resin, a polyvinyl alcohol based resin, a vinyl acetate based resin, a polyarylate based resin, a polystyrene based resin, a polyethersulfone based resin, a polysulfone based resin, a polyamide based resin, a polyimide based resin, a mixture or a copolymer thereof, and the like.

A base film may be formed of a single layer including only one type of resin described above or of two or more types of resins as blended. Naturally, a multi-layered film instead of a single layer may be formed.

Polyethylene, polypropylene, and the like are exemplified as the polyolefin based resins, and they are preferred because they are likely to be drawn at a high ratio in a stable manner. In addition, an ethylene-polypropylene copolymer obtained by copolymerizing ethylene with propylene, and the like can also be used. Other types of monomers can also be copolymerized, and examples of other types of monomers that can be copolymerized with propylene include ethylene and α-olefin. As α-olefin, α-olefin having a carbon number not smaller than 4 is preferably employed and α-olefin having a carbon number from 4 to 10 is more preferably employed. Specific examples of α-olefin having a carbon number from 4 to 10 include: straight-chain monoolefins such as 1-butene, 1-pentene, 1-hexene, 1-heptene, 1-octene, and 1-decene; branched monoolefins such as 3-methyl-1-butene, 3-methyl-1-pentene, and 4-methyl-1-pentene; vinylcyclohexane; and the like. A copolymer of propylene and other monomers that can be copolymerized therewith may be a random copolymer or a block copolymer. A content of a constitutional unit derived from other monomers in a copolymer can be found by conducing infrared (IR) spectrum measurement in accordance with a method described on page 616 of "*Handbook of Polymer Analysis*" (1995, published by Kinokuniya Company Ltd.).

Among the above, as a propylene based resin forming a propylene based resin film, a homopolymer of propylene, a propylene-ethylene random copolymer, a propylene-1-butene random copolymer, and a propylene-ethylene-1-butene random copolymer are preferably used.

In addition, stereoregularity of a propylene based resin forming a propylene based resin film is preferably substantially isotactic or syndiotactic. A propylene based resin film formed of a propylene based resin having substantially isotactic or syndiotactic stereoregularity is relatively good in its handleability and excellent in mechanical strength in an environment at a high temperature.

A polyester based resin is a polymer having ester linkage, and it is mainly a polycondensation product of polyvalent carboxylic acid and polyalcohol. Divalent dicarboxylic acid is mainly used as polyvalent carboxylic acid to be used, and for example, terephthalic acid, isophthalic acid, dimethyl terephthalate, dimethyl naphthalene dicarboxylate, or the like is used. In addition, divalent diol is mainly used as a polyalcohol to be used, and examples thereof include propanediol, butanediol, neopentylglycol, cyclohexanedimethanol, and the like.

As a representative example of a polyester based resin, polyethylene terephthalate which is a copolymer of terephthalic acid and ethylene glycol is exemplified. Though polyethylene terephthalate is a crystalline resin, polyethylene terephthalate before crystallization is more readily subjected to such treatment as drawing. If necessary, polyethylene terephthalate can be crystallized through heat treatment or the like during or after drawing. In addition, copolymerized polyester having crystallinity lowered by copolymerization of a main-chain of polyethylene terephthalate further with other types of monomers (or made amorphous) is also suitably employed. As an example of such a resin, for example, a resin obtained by copolymerizing cyclohexanedimethanol, isophthalic acid, or the like is suitably employed. These resins are also excellent in ductility and they can suitably be used.

As specific resins other than polyethylene terephthalate and a copolymer thereof, polybutylene terephthalate, polyethylene naphthalate, polybutylene naphthalate, polytrimethylene terephthalate, polytrimethylene naphthalate, polycyclohexane dimethylterephthalate, polycyclohexane dimethylnaphthalate, and the like are exemplified. A blend resin and a copolymer thereof can also suitably be employed.

As a cyclic polyolefin based resin, a norbornene based resin is preferably used. The cyclic polyolefin based resin is a generic denotation of resins polymerized by using cyclic olefin as a polymerization unit, and for example, resins described in Japanese Patent Laying-Open No. 1-240517, Japanese Patent Laying-Open No. 3-14882, Japanese Patent Laying-Open No. 3-122137, and the like are exemplified. As specific examples, a ring-opening (co)polymer of cyclic olefin, an addition polymer of cyclic olefin, cyclic olefin, α-olefin such as ethylene and propylene, and a copolymer thereof (representatively a random copolymer), a graft polymer obtained by modifying the former with unsaturated carboxylic acid or a derivative thereof, a hydride thereof, and the like are exemplified. As a specific example of cyclic olefin, a norbornene based monomer is exemplified.

Various products are commercially available as a cyclic polyolefin based resin. As specific examples, Topas (trademark) (manufactured by Ticona), ARTON (trademark) (manufactured by JSR Corporation), ZEONOR (trademark) (manufactured by ZEON Corporation), ZEONEX (trademark) (manufactured by ZEON Corporation), and APEL (trademark) (manufactured by Mitsui Chemicals, Inc.) are exemplified.

Any appropriate (meth)acryl based resin can be adopted as a (meth)acryl based resin. For example, poly (meth)acrylic ester such as poly(methyl methacrylate), a methyl methacrylate-(meth)acrylic acid copolymer, a methyl methacrylate-(meth)acrylate copolymer, a methyl methacrylate-acrylic ester-(meth)acrylic acid copolymer, a methyl (meth)acrylate-styrene copolymer (such as an MS resin), and a polymer having an alicyclic hydrocarbon group (for example, a methyl methacrylate-cyclohexyl methacrylate copolymer, a methyl methacrylate-norbornyl (meth)acrylate copolymer, and the like), are exemplified. Preferably, C1-6 poly (alkyl (meth)acrylate) such as poly(methyl (meth)acrylate) is exemplified. As a (meth)acryl based resin, more preferably, a methyl methacrylate based resin mainly composed of methyl methacrylate (50 to 100 weight %, preferably 70 to 100 weight %) is employed.

A cellulose ester based resin is an ester of cellulose and fatty acid. Specific examples of such cellulose ester based resins include cellulose triacetate, cellulose diacetate, cellulose tripropionate, cellulose dipropionate, and the like. In addition, a copolymer thereof, a substance obtained by modifying some hydroxyl groups with a substituent of other types or the like, and the like are exemplified. Among these, cellulose triacetate is particularly preferred. Many cellulose triacetate products are commercially available, and they are advantageous also in terms of availability and cost. Examples of commercially available products of cellulose triacetate include FUJITAC (trademark) TD80 (manufactured by Fujifilm Corporation), FUJITAC (trademark) TD80UF (manufactured by Fujifilm Corporation), FUJITAC (trademark) TD80UZ (manufactured by Fujifilm Corporation), FUJITAC (trademark) TD40UZ (manufactured by Fujifilm Corporation), KC8UX2M (manufactured by Konica Minolta Optics, Inc.), KC4UY (manufactured by Konica Minolta Optics, Inc.), and the like.

A polycarbonate based resin is an engineering plastics composed of a polymer resulting from bonding of monomer units with a carbonate group being interposed, and it is a resin having high shock resistance, heat resistance, and flame resistance. In addition, since the polycarbonate based resin has high transparency, it is suitably used also in optical applications. In optical applications, a resin referred to as modified polycarbonate, as obtained by modifying a polymer mainchain in order to lower a modulus of photoelasticity, copolymerized polycarbonate of which wavelength dependence has been improved, and the like are also commercially available, and they can suitably be employed.

Such polycarbonate resins are widely commercially available, and for example, Panlite (trademark) (TEIJIN Chemicals Ltd.), Iupilon (trademark) (Mitsubishi Engineering-Plastics Corporation), SD Polyca (trademark) (Sumitomo Dow Limited), CALIBRE (trademark) (The Dow Chemical Company), and the like are exemplified.

Any appropriate additive may be added to the base film, in addition to the thermoplastic resin above. As such an additive, for example, a UV absorber, an antioxidant, a lubricant, a plasticizer, a release agent, an anti-coloring agent, a flame retardant, a nucleating agent, an antistatic agent, a pigment, a coloring agent, and the like are exemplified. A content of the thermoplastic resin exemplified above in the base film is preferably from 50 to 100 weight %, more preferably from 50 to 99 weight %, further preferably from 60 to 98 weight %, and particularly preferably from 70 to 97 weight %. This is because, when the content of the thermoplastic resin in the base film is lower than 50 weight %, high transparency or the like originally possessed by the thermoplastic resin may not sufficiently be exhibited.

Though a thickness of the base film can be determined as appropriate, generally, in terms of strength and workability such as handleability, the thickness is preferably from 1 to 500 μm, more preferably from 1 to 300 μm, and further preferably from 5 to 200 μm. A thickness of the base film is most preferably from 5 to 150 μm.

At least a surface of the base film, on a side where a resin layer is to be formed, may be subjected to corona treatment, plasma treatment, flame treatment, or the like, in order to improve adhesiveness with the resin layer. In addition, in order to improve adhesiveness, such a thin layer as a primer layer or an adhesive layer may be formed on a surface of the base film on the side where the resin layer is to be formed. It is noted that the base film herein refers to a film not containing an adhesive layer, a corona-treated layer, and the like.

(Resin Layer)

A polyvinyl alcohol based resin is used for the resin layer. As a polyvinyl alcohol based resin used in the present invention, a polyvinyl alcohol based resin having a degree of saponification from 90 mol % to 100 mol % is suitably used, and modified polyvinyl alcohol, which has partially been modified, may be employed. For example, a substance obtained by modifying by several %, a polyvinyl alcohol resin with olefin such as ethylene or propylene, unsaturated carboxylic acid such as acrylic acid, methacrylic acid, or crotonic acid, alkyl ester of unsaturated carboxylic acid, acrylamide, or the like, and the like are exemplified. Though an average degree of polymerization of a polyvinyl alcohol based resin is not particularly limited either, the average degree of polymerization is preferably from 100 to 10000 and more preferably from 1500 to 10000.

As a polyvinyl alcohol resin providing such characteristics, for example, PVA124 (a degree of saponification: 98.0 to 99.0 mol %), PVA117 (a degree of saponification: 98.0 to 99.0 mol %), PVA624 (a degree of saponification: 95.0 to 96.0 mol %), PVA617 (a degree of saponification: 94.5 to 95.5 mol %), and the like manufactured by Kuraray Co., Ltd.; for example, AH-26 (a degree of saponification: 97.0 to 98.8 mol %), AH-22 (a degree of saponification: 97.5 to 98.5 mol %), NH-18 (a degree of saponification: 98.0 to 99.0 mol %), NH-300 (a degree of saponification: 98.0 to 99.0 mol %), and the like manufactured by The Nippon Synthetic Chemical Industry Co., Ltd.; and for example, JF-17 (a degree of saponification: 98.0 to 99.0 mol %), JF-17L (a degree of saponification: 98.0 to 99.0 mol %), JF-20 (a degree of saponification: 98.0 to 99.0 mol %), and the like of Japan Vam & Poval Co., Ltd. are exemplified, and they can suitably be used.

[Drawing Step (S20)]

Here, a stack film constituted of a base film and a resin layer is uniaxially drawn. Preferably, the stack film is uniaxially drawn at a draw ratio higher than 5 and not higher than 17. Further preferably, the stack film is uniaxially drawn at a draw ratio higher than 5 and not higher than 8. When the draw ratio is not higher than 5, a resin layer composed of a polyvinyl alcohol based resin is not sufficiently oriented, which may result in such a defect as a degree of polarization of a polarizer layer not sufficiently being high. On the other hand, when the draw ratio is higher than 17, a fracture of the stack film during drawing is more likely, and at the same time, a thickness of the drawn film becomes thinner than necessary, which may lead to lowering in workability and handleability in a subsequent step. Drawing treatment in the drawing step (S20) is not limited to drawing in a single step and it can also be performed in multiple steps. In this case, drawing treatment in a second step or later can be performed also in the drawing step (S20), however, it may be performed simultaneously with treatment in the dyeing step (S30) or the cross-linking step (S40). When drawing is carried out in multiple steps as such, drawing treatment is performed such that a draw ratio is higher than 5 as the total of ratios in all steps in the drawing treatment.

In the drawing step (S20) in the present embodiment, vertical drawing treatment performed in a longitudinal direction of the stack film, lateral drawing treatment for drawing in a direction of width, or the like can be performed. As a vertical drawing technique, a roll drawing method, a compression drawing method, and the like are exemplified. As a lateral drawing technique, a tenter method and the like are exemplified.

In addition, though any of a wet drawing method and a dry drawing method can be adopted for drawing treatment, use of a dry drawing method is preferred in that a temperature at the time of drawing of the stack film can be selected from a wide range.

[Dyeing Step (S30)]

Here, a resin layer in the drawn stack film is dyed with a dichromatic dye. As a dichromatic dye, for example, iodine, an organic dye, and the like are exemplified. As an organic dye, for example, red BR, red LR, red R, pink LB, rubine BL, Bordeaux GS, sky blue LG, lemon yellow, blue BR, blue 2R, navy RY, green LG, violet LB, violet B, black H, black B, black GSP, yellow 3G, yellow R, orange LR, orange 3R, scarlet GL, scarlet KGL, congo red, brilliant violet BK, supra blue G, supra blue GL, supra orange GL, direct sky blue, direct fast orange S, fast black, and the like can be employed. One type of such dichromatic substances may be used or two or more types of them may be used together.

The dyeing step is performed, for example, by immersing the entire stack film in a solution containing a dichromatic dye above (a dyeing solution). As a dyeing solution, a solution obtained by dissolving a dichromatic dye above in a solvent can be employed. Though water is generally employed as a solvent for a dyeing solution, an organic solvent having compatibility with water may further be added. Concentration of a dichromatic dye is preferably from 0.01 to 10 weight %, more preferably from 0.02 to 7 weight %, and particularly preferably from 0.025 to 5 weight %.

In the case of using iodine as a dichromatic dye, an iodide is preferably further added because efficiency in dyeing can further be improved. As this iodide, for example, potassium iodide, lithium iodide, sodium iodide, zinc iodide, aluminum iodide, lead iodide, copper iodide, barium iodide, calcium iodide, tin iodide, titanium iodide, and the like are exemplified. A ratio of addition of these iodides is preferably from 0.01 to 20 weight % in a dyeing solution. Among the iodides, potassium iodide is preferably added. In the case of adding potassium iodide, a ratio in weight between iodine and potassium iodide is preferably in a range from 1:5 to 1:100, more preferably in a range from 1:6 to 1:80, and particularly preferably in a range from 1:7 to 1:70.

Though a time period of immersion of the stack film in the dyeing solution is not particularly limited, the time period is normally preferably in a range from 15 seconds to 15 minutes and more preferably in a range from 30 seconds to 3 minutes. In addition, a temperature of the dyeing solution is preferably in a range from 10 to 60° C. and more preferably in a range from 20 to 40° C.

Though the dyeing treatment can also be performed simultaneously with the drawing step, it is preferably performed after an undrawn film is subjected to the drawing step such that a dichromatic dye adsorbed to a polyvinyl alcohol based resin can satisfactorily be oriented. Here, a film drawn at a target ratio in advance may merely be dyed, or a method of achieving a target ratio as a whole by again drawing, during dyeing, a film which has been drawn in advance at a low ratio may be employed. Furthermore, in the case of performing drawing during subsequent cross-linking treatment, it is also possible that only drawing at a low ratio is performed here. In this case, adjustment should only timely be made such that a target ratio is achieved after the cross-linking treatment.

[Cross-Linking Step (S40)]

Following the dyeing step (S30), the cross-linking step (S40) is performed.

The cross-linking step can be performed, for example, by immersing the stack film subjected to the dyeing step (S30) in a solution containing a cross-linker (a cross-linking solution). As a cross-linker, a conventionally known substance can be employed. For example, a boron compound such as boric acid or borax, glyoxal, glutaraldehyde, and the like are exemplified. One type of them may be used, or two or more types of them may be used together.

As a cross-linking solution, a solution obtained by dissolving a cross-linker in a solvent can be employed. For example, though water can be used as a solvent, an organic solvent having compatibility with water may further be contained. Concentration of a cross-linker in a cross-linking solution is preferably in a range from 1 to 20 weight % and more preferably from 6 to 15 weight %, without limited thereto.

An iodide may be added to a cross-linking solution. By adding an iodide, polarization characteristics in a plane of the resin layer can be more uniform. As an iodide, for example, potassium iodide, lithium iodide, sodium iodide, zinc iodide, aluminum iodide, lead iodide, copper iodide, barium iodide, calcium iodide, and tin iodide, titanium iodide are exemplified. A content of an iodide is from 0.05 to 15 weight % and more preferably from 0.5 to 8 weight %.

A time period of immersion of the stack film in a cross-linking solution is normally preferably from 15 seconds to 20 minutes and more preferably from 30 seconds to 15 minutes. In addition, a temperature of a cross-linking solution is preferably in a range from 10 to 90° C.

It is noted that the cross-linking step can also be performed simultaneously with the dyeing step, by blending a cross-linker in a dyeing solution. In addition, a film drawn at a target ratio in advance may merely be cross-linked, or cross-linking treatment and drawing treatment may be performed simultaneously. A target ratio as a whole may be achieved by again drawing, during cross-linking treatment, a drawn film which has been drawn in advance at a low ratio in the drawing step.

A cleaning step is preferably performed after the cross-linking step. Water cleaning treatment can be performed as the cleaning step. The water cleaning treatment can be performed normally by immersing the drawn film in aqua pura such as ion exchange water or distilled water. A water cleaning temperature is normally in a range from 3 to 50° C. and preferably in a range from 4 to 20° C. An immersion time period is normally from 2 to 300 seconds and preferably from 3 to 240 seconds.

The cleaning step may be combination of cleaning treatment with an iodide solution and water cleaning treatment, and a solution blended as appropriate with such a liquid alcohol as methanol, ethanol, isopropyl alcohol, butanol, or propanol can also be used. Through the steps above, the resin layer has a function as a polarizer. A resin layer having a function as a polarizer is herein referred to as a polarizer layer.

[Removal-Prior-to-Bonding Step (S50)]

A method capable of continuously handling a long length such as a roll is preferable for cutting a stack film in the removal-prior-to-bonding step (S50). Though a method is not particularly limited, for example, a method generally called a slitter or the like can suitably be used.

By way of example of a slitter, for example, a method of using a blade called a razor blade is exemplified. Among methods using the same razor blades, in particular, midair cutting of slitting in midair without providing a backup guide, a caliber rolling method in which a blade is introduced in a threaded roll serving as a backup guide and meandering of a slit is stabilized, and the like are available. Other than these, a method of using two circular blades called shear blades and performing slitting while rotating the blades together with transportation of a film and applying pressure to a lower blade from an upper blade, a method of performing slitting by pressing a blade called a shear blade or a score blade against a hardened roll or the like, a method of performing slitting while two shear blades are combined to perform cutting as scissors do, and the like can be used. Among these, "a caliber rolling method using a razor blade," which is a method in which a film slit position can readily be changed and running is likely to be stabilized, or the like is suitably used.

Since this removal-prior-to-bonding step (S50) does not require a large-scale apparatus, it is efficient to perform this step as being incorporated in line of any other steps. For example, an end portion removal apparatus such as a slitter can be installed immediately after the cross-linking step (S40) to remove an end portion (a first end portion) therein, and a process can proceed to the drying step. Alternatively, similarly, the apparatus may be installed immediately after the drying step or the like. Naturally, only a slitting step may be present as another independent step, and for example, a step where such a slitter as a rewinder for switching winding-up of a roll is installed or the like is exemplified as an example of such an independent step. Normally, however, preferably, these steps are continuous in one line from a point of view of productivity, and facilities in which the cross-linking step (S40), the removal-prior-to-bonding step (S50), and the bonding step (S60) are sequentially continuous are preferred. Furthermore, a step of drying a polarizer is preferably provided either before or after, or before and after the removal-prior-to-bonding step. As the drying step, any appropriate method (such as air drying, air-blown drying, heated drying) can be adopted. For example, a drying temperature in the case of heated drying is normally from 20 to 95° C. and a drying time period is normally approximately from 1 to 15 minutes.

A main cause of a defect in a film, from which an end portion (a first end portion) is not removed, at the time of bonding of a protection film includes a significant difference in thickness caused by wave curl, warp, creases, or the like in the end portion, which occurs in the cross-linking step (S40), and most of defects are such defects as being caused by accumulation of an adhesive in a portion where such a difference in height exists (for example, blue stain of a polarizer due to insufficient drying of accumulation). In addition, in the case where a region where a resin layer is not formed (a third end portion) is present in the stacking step (S10) and such a region (the third end portion) is not removed before or after the drawing step (S20), distortion at the end portion or wave curl as well as a height difference itself between an applied portion and an unapplied portion in the drawing step (S20) further aggravate the defects at the time of bonding. From such a point of view, in the removal-prior-to-bonding step (S50), the third end portion where the resin layer is not formed is naturally removed and a region slightly inside the third end portion is preferably removed so that a portion extremely different in thickness is removed. Naturally, in the case where a thickness is relatively constant as far as the end portion and it is not necessary to remove the end portion, removal may be carried out such that the first end portion coincides with the third end portion.

The removal-prior-to-dyeing step (S25) in the third embodiment can also be performed with a method similar to that in the removal-prior-to-bonding step (S50) described above.

[Bonding Step (S60)]

Here, a protection film is bonded to the polarizer layer on its surface opposite from the base film to thereby obtain a polarizing plate. As a method of bonding the protection film, a method of bonding the polarizer layer and the protection film to each other by using a pressure-sensitive adhesive and a method of bonding a surface of the polarizer layer and the protection film to each other with an adhesive are exemplified.

(Protection Film)

A protection film used in the bonding step (S50) may simply be a protection film not having an optical function or may be a protection film also having an optical function such as a phase difference film or a luminance improving film. Though a material for a protection film is not particularly limited, for example, films conventionally widely used in the field of the art including a cyclic polyolefin based resin film, a cellulose acetate based resin film composed of such a resin as triacetylcellulose or diacetylcellulose, a polyester based resin film composed of such a resin as polyethylene terephthalate, polyethylene naphthalate, or polybutylene terephthalate, a polycarbonate based resin film, an acryl based resin film, a polypropylene based resin film, and the like can be exemplified.

As a cyclic polyolefin based resin, appropriate commercially available products such as Topas (trademark) (manufactured by Ticona), ARTON (trademark) (manufactured by JSR Corporation), ZEONOR (trademark) (manufactured by ZEON Corporation), ZEONEX (trademark) (manufactured by ZEON Corporation), and APEL (trademark) (manufactured by Mitsui Chemicals, Inc.) can suitably be used. In making a film by forming a film of such a cyclic polyolefin based resin, such a known method as a solvent casting method or a melt extrusion method is used as appropriate. In addition, commercially available products of films made of a cyclic polyolefin based resin and manufactured in advance, such as Escena (trademark) (manufactured by Sekisui Chemical Co., Ltd.), SCA40 (manufactured by Sekisui Chemical Co., Ltd.), and a ZEONOR (trademark) film (manufactured by Optes Inc.) may be used.

The cyclic polyolefin based resin film may be uniaxially or biaxially drawn. As a result of drawing, any phase difference value can be provided to a cyclic polyolefin based resin film. Drawing is normally performed continuously while winding up from a film roll, and the film is drawn in a heating furnace in a direction of travel of the roll, a direction perpendicular to the direction of travel, or in both of them. A temperature in the heating furnace is normally in a range from a temperature close to a glass transition temperature of the cyclic polyolefin based resin to a temperature calculated as a glass transition temperature+100° C. A draw ratio is normally from 1.1 to 6 in one direction and preferably from 1.1 to 3.5.

Since the cyclic polyolefin based resin film is generally poor in surface activity, a surface to adhere to the polarizer layer is preferably subjected to such surface treatment as plasma treatment, corona treatment, UV irradiation treatment, flame treatment, or saponification treatment. Among these, plasma treatment and corona treatment which can relatively readily be performed are suitable.

As a cellulose acetate based resin film, appropriate commercially available products such as FUJITAC (trademark) TD80 (manufactured by Fujifilm Corporation), FUJITAC (trademark) TD80UF (manufactured by Fujifilm Corporation), FUJITAC (trademark) TD80UZ (manufactured by Fujifilm Corporation), FUJITAC (trademark) TD40UZ (manufactured by Fujifilm Corporation), KC8UX2M (manufactured by Konica Minolta Optics, Inc.), and KC4UY (manufactured by Konica Minolta Optics, Inc.) can suitably be used.

A liquid crystal layer or the like may be formed on a surface of the cellulose acetate based resin film in order to improve viewing-angle characteristics. In addition, in order to provide phase difference, a cellulose acetate based resin film may be drawn. The cellulose acetate based resin film is normally subjected to saponification treatment in order to enhance adhesion with a polarization film. As the saponification treatment, a method of immersion in an aqueous solution of such alkali as sodium hydroxide or potassium hydroxide can be adopted.

An optical layer such as a hard coat layer, an antiglare layer, or an anti-reflection coating can also be formed on a surface of the protection film as described above. A method of forming these optical layers on the surface of the protection film is not particularly limited, and a known method can be used.

In view of demands for a smaller thickness, a thickness of the protection film is preferably small, and a thickness not greater than 88 µm is preferred and a thickness not greater than 48 µm is more preferred. Too small a thickness leads to lower strength and poor workability, and hence a thickness is preferably not smaller than 5 µm.

(Pressure-Sensitive Adhesive)

A pressure-sensitive adhesive used for bonding between the protection film and the polarizer layer is normally composed of a composition including an acryl based resin, a styrene based resin, a silicone based resin, or the like as a base polymer, to which a cross-linker such as an isocyanate compound, an epoxy compound, an aziridine compound, or the like is added. Furthermore, a pressure-sensitive adhesive layer exhibiting a light scattering property by containing fine particles can also be used.

Though a thickness of the pressure-sensitive adhesive layer is preferably from 1 to 40 μm, application by a small thickness is preferred so long as such characteristics as workability and durability are not impaired, and more preferably a thickness is from 3 to 25 μm. When the thickness is from 3 to 25 μm, the pressure-sensitive adhesive layer has good workability and such a thickness is suitable also in terms of suppressing change in dimension of the polarization film. When the pressure-sensitive adhesive layer is smaller than 1 μm, adhesive performance lowers. When the thickness exceeds 40 μm, such a defect as the pressure-sensitive adhesive extending off is likely.

In a method of bonding the protection film to the polarizer layer with the pressure-sensitive adhesive, the pressure-sensitive adhesive layer may be provided on the protection film surface and thereafter bonded to the polarizer layer, or the pressure-sensitive adhesive layer may be provided on the polarizer layer surface and thereafter bonded to the protection film.

A method of forming a pressure-sensitive adhesive layer is not particularly limited, and a solution containing each component represented by the base polymer described above may be applied to the protection film surface or the polarizer layer surface and then dried to form the pressure-sensitive adhesive layer, and thereafter the protection film and the polarizer layer may be bonded to each other. Alternatively, the pressure-sensitive adhesive layer may be formed on a separator and thereafter the pressure-sensitive adhesive layer may be transferred to the protection film surface of the polarizer layer surface for stacking. In addition, in forming the pressure-sensitive adhesive layer on the protection film or the polarizer layer surface, as necessary, one or two of the protection film, polarizer layer surface and the pressure-sensitive adhesive layer may be subjected to adhesive treatment such as corona treatment.

(Adhesive)

An adhesive used for bonding between the protection film and the polarizer layer is exemplified by a water based adhesive including a polyvinyl alcohol based resin aqueous solution or an aqueous two-part urethane based emulsion adhesive. In the case where a cellulose acetate based film which was made hydrophilic through saponification treatment or the like is used as the protection film, a polyvinyl alcohol based resin aqueous solution is suitably used as a water based adhesive for bonding to the polarizer layer. Polyvinyl alcohol based resins used as the adhesive include not only a vinyl alcohol homopolymer which is obtained by subjecting polyvinyl acetate representing a homopolymer of vinyl acetate to saponification treatment but also a vinyl alcohol based copolymer obtained by subjecting a copolymer of vinyl acetate and other monomers which can be copolymerized therewith to saponification treatment, a modified polyvinyl alcohol based polymer obtained by partially modifying hydroxyl groups thereof, and the like. Polyaldehyde, a water-soluble epoxy compound, a melamine based compound, a zirconia compound, a zinc compound, or the like may be added as an additive to a water based adhesive. In using such a water based adhesive, an adhesive layer obtained therefrom is normally not greater than 1 μm.

A method of bonding the polarizer layer and the protection film to each other by using a water based adhesive is not particularly limited, and for example, a method of uniformly applying an adhesive onto a surface of the polarizer layer and/or the protection film, lying another film on the applied surface, and performing bonding with the use of a roll or the like, followed by drying, or the like is exemplified. Normally, an adhesive is applied at a temperature from 15 to 40° C. after preparation thereof and a bonding temperature is normally in a range from 15 to 30° C.

In the case of using a water based adhesive, in order to remove water contained in the water based adhesive after bonding of the polarizer layer and the protection film to each other, the stack film is dried. A temperature in a drying furnace is preferably from 30 to 90° C. When the temperature is lower than 30° C., the polarizer layer surface and the protection film surface tend to peel off from each other. When the temperature is equal to or higher than 90° C., optical performance may deteriorate due to heat. A drying time period can be set to 10 to 1000 seconds, and in particular from a point of view of productivity, it is set preferably to 60 to 750 seconds and further preferably to 150 to 600 seconds.

After drying, curing approximately for 12 to 600 hours at a room temperature or a temperature slightly higher than that, for example, at a temperature approximately from 20 to 45° C., may further be carried out. A temperature during curing is generally set to be lower than a temperature adopted during drying.

In addition, as an adhesive for bonding the polarizer layer and the protection film to each other, a photo-hardening adhesive can also be used. The photo-hardening adhesive herein refers to an adhesive hardened as it is irradiated with such active energy beams as ultraviolet rays, and for example, an adhesive containing a polymerizable compound and a photo-polymerization initiator, an adhesive containing a photoreactive resin, an adhesive containing a binder resin and a photoreactive cross-linker, and the like can be exemplified. As a polymerizable compound, a photopolymerizable monomer such as a photo-hardening epoxy based monomer, a photo-hardening acryl based monomer, and a photo-hardening urethane based monomer, an oligomer derived from such monomers, and the like can be exemplified. As a photopolymerization initiator, an initiator containing a substance generating such active species as neutral radicals, anion radicals, or cation radicals as it is irradiated with such active energy beams as ultraviolet rays can be exemplified. As a photo-hardening adhesive containing a polymerizable compound and a photopolymerization initiator, an adhesive containing a photo-hardening epoxy based monomer and a cationic photopolymerization initiator is preferred.

As described above, partial accumulation of an adhesive due to creases or wrinkles is exemplified as a defect which occurs at the time when a film from which an end portion (a first end portion) is not removed is bonded to a protection film. If this portion of accumulation is heated in the case where a photo-hardening adhesive is employed, this portion may experience yellowing. From a point of view of avoiding this yellowing as well, the manufacturing method according to the present invention in which a first end portion is removed is effective.

A conventionally known method can be used as a method of bonding the polarizer layer and the protection film to each other with a photo-hardening adhesive, and for example, a method of applying an adhesive onto an adhesive surface of the polarizer layer and/or the protection film with a casting method, a Meyer bar coating method, a gravure coating method, a comma coater method, a doctor plate method, a dye coating method, a dip coating method, a spraying method, or the like and then lying one over another is exemplified. The casting method refers to a method of flowing down an adhesive over a surface of a polarization film or a protection film which is an application target and spreading the adhesive over the same while the polarization film or the protection film is moved substantially in a vertical direction, substantially in a horizontal direction, or in a diagonal direction between them.

After the adhesive is applied to the surface of the polarizer layer or the protection film, the polarization film and the protection film are sandwiched between nip rolls or the like with an adhesive applied surface being interposed, to thereby achieve bonding and adhesion. In addition, a method of dropping an adhesive between the polarizer layer and the protection film while the polarizer layer and the protection film overlap with each other and thereafter applying a pressure to this stack film with the use of a roll or the like to uniformly spread the adhesive can also suitably be employed. In this case, a metal, rubber, or the like can be used as a material for the roll. Moreover, a method of dropping an adhesive between the polarizer layer and the protection film and thereafter passing this stack film between rolls to apply pressure and spread the adhesive is also preferably adopted. In this case, these rolls may be made of the same material or of different materials. A thickness of the adhesive layer after bonding with the use of the nip roll or the like before drying or hardening is preferably not greater than 5 μm and not smaller than 0.01 μm.

An adhesive surface of the polarizer layer and/or the protection film may be subjected as appropriate to such surface treatment as plasma treatment, corona treatment, UV irradiation treatment, flame treatment, or saponification treatment, in order to improve adhesion. As the saponification treatment, a method of immersion in an aqueous solution of such alkali as sodium hydroxide or potassium hydroxide can be adopted.

In the case of using a photo-hardening resin as an adhesive, after the polarization film and the protection film are joined to each other, the photo-hardening adhesive is cured by irradiating the adhesive with active energy beams. Though a light source of the active energy beams is not particularly limited, active energy beams having emission distribution in a region of wavelengths not longer than 400 nm are preferred. Specifically, a low-pressure mercury lamp, a medium-pressure mercury lamp, a high-pressure mercury lamp, a super-high-pressure mercury lamp, a chemical lamp, a black light lamp, a microwave excited mercury lamp, a metal halide lamp, or the like is preferably used.

Intensity of irradiation of a photo-hardening adhesive with light is determined as appropriate by composition of a photo-hardening adhesive and it is not particularly limited, however, irradiation intensity in a wavelength region effective for activation of a polymerization initiator is preferably from 0.1 to 6000 mW/cm$^2$. When the irradiation intensity is not lower than 0.1 mW/cm$^2$, a reaction time period is not excessively long. When the irradiation intensity is not higher than 6000 mW/cm$^2$, yellowing of an epoxy resin or deterioration of a polarization film due to heat radiated from a light source and heat generation during hardening of a photo-hardening adhesive is less likely. A time period of irradiation of a photo-hardening adhesive with light is applied depending on a photo-hardening adhesive to be hardened and it is not particularly limited, however, it is preferably set such that a multiplied quantity of light represented as a product of irradiation intensity and an irradiation time period above is from 10 to 10000 mJ/cm$^2$. When the multiplied quantity of light toward a photo-hardening adhesive is not lower than 10 mJ/cm$^2$, active species derived from a polymerization initiator can be generated in a sufficient amount and hardening reaction can more reliably proceed. When the multiplied quantity of light is not higher than 10000 mJ/cm$^2$, the irradiation time period is not excessively long and good productivity can be maintained. It is noted that a thickness of an adhesive layer after irradiation with active energy beams is normally approximately from 0.001 to 5 μm, preferably not smaller than 0.01 μm and not greater than 2 μm, and further preferably not smaller than 0.01 μm and not greater than 1 μm.

In the case where a photo-hardening adhesive is hardened by irradiation with active energy beams, hardening is preferably carried out under such a condition that various functions of the polarizing plate are not lowered, such as a degree of polarization, transmissivity, and a hue of the polarization film, as well as transparency of the protection film.

[Separation Step (S70)]

In the manufacturing method according to the present invention, after the bonding step (S60) of bonding a protection film to a polarizer layer, a step (S70) of separating a base film can be performed. In the separation step (S70) of the base film, the base film is separated from the stack film. A method of separating the base film is not particularly limited, and separation can be achieved with a method similar to a step of separating a film to be separated, which is normally performed for a polarizing plate with a pressure-sensitive adhesive. Separation may be carried out immediately after the bonding step (S60), or separation may be carried out by separately providing a separation step after once winding up the film like a roll.

EXAMPLES

Example 1

(1) Fabrication of Base Film

A base film roll having a three-layered structure in which a resin layer composed of homopolypropylene ("Sumitomo Noblen FLX80E4" manufactured by Sumitomo Chemicals Co., Ltd., melting point Tm=163° C.), which was a homopolymer of propylene, was arranged on each of opposing sides of a resin layer composed of a random copolymer ("Sumitomo Noblen W151" manufactured by Sumitomo Chemicals Co., Ltd., melting point Tm=138° C.) of propylene/ethylene containing approximately 5 weight % of ethylene unit was fabricated by co-extrusion using a multi-layer extruder. A total thickness of the obtained base film roll was 100 μm, and a ratio of thicknesses among the layers (FLX80E4/W151/FLX80E4) was 3/4/3.

(2) Formation of Primer Layer

Polyvinyl alcohol powders ("Z-200" manufactured by The Nippon Synthetic Chemical Industry Co., Ltd., an average degree of polymerization of 1100, an average degree of saponification of 99.5 mol %) were dissolved in hot water at 95° C., to prepare a polyvinyl alcohol aqueous solution having concentration of 3 weight %. A cross-linker ("Sumirez Resin 650" manufactured by Sumitomo Chemicals Co., Ltd.) was mixed in the obtained aqueous solution by 5 parts by weight with respect to 6 parts by weight of the polyvinyl alcohol powders. A corona-treated surface of the base film roll above that had been subjected to corona treatment was continuously coated with the obtained mixed aqueous solution by using a gravure coater, followed by drying for 10 minutes at 80° C., to thereby form a primer layer having a thickness of 0.2 μm. This operation was performed also on an opposite side of the base film, to create a film constituted of "the primer layer/the base film/the primer layer," with the primer layer being provided on each of the opposing surfaces.

(3) Resin Layer Formation Step

Polyvinyl alcohol powders ("PVA124" manufactured by Kuraray Co., Ltd., an average degree of polymerization of 2400, an average degree of saponification of 98.0 to 99.0 mol %) were dissolved in hot water at 95° C., to prepare a polyvinyl alcohol aqueous solution having concentration of 8 weight %. One primer layer on the base film was continuously coated with the obtained aqueous solution by using a comma coater, followed by drying for 5 minutes at 80° C., to thereby fabricate a stack film roll having a three-layered structure constituted of the base film/the primer layer/the polyvinyl alcohol based resin layer. A thickness of the resin layer composed of a polyvinyl alcohol based resin was 10.6 μm. Here again, the same operation was performed also on the primer layer on the opposite side of the base film to create a stack film constituted of "the polyvinyl alcohol based resin layer/the primer layer/the base film/the primer layer/the polyvinyl alcohol based resin layer," with the resin layer composed of the polyvinyl alcohol based resin being provided on each of the opposing surfaces. Here, a polyvinyl alcohol aqueous solution was not applied in a region at each of opposing ends which extended by 1 cm from an end of the base film (a third end portion).

(4) Removal-Prior-to-Dyeing Step and Drawing Step

The both end portions (second end portions) of the stack film roll above were cut each at a position distant by 2cm from the end and an unapplied portion was continuously removed (the removal-prior-to-dyeing step). Thereafter, with the use of a roll midair drawing apparatus, free-end uniaxial drawing at a ratio of 5.8 was carried out in a vertical direction at a drawing temperature of 160° C. to thereby obtain a stack film roll. A thickness of the obtained stack film roll was 55.2 μm, and a thickness of the polyvinyl alcohol based resin layer was 5.1 μm.

(5) Dyeing Step, Cross-Linking Step, Removal-Prior-to-Bonding Step

The drawn stack film roll was subjected to the dyeing step and the cross-linking step in the following procedure. Initially, the stack film was immersed in a dyeing solution at 30° C. which was an aqueous solution containing iodine and potassium iodide at 30° C. such that a retention time period was approximately 150 seconds. The polyvinyl alcohol based resin layer was thus dyed (the dyeing step) and then an excessive iodine solution was washed away with aqua pura at 10° C. Then, the stack film was immersed in a cross-linking solution at 72° C. which was an aqueous solution containing boric acid and potassium iodide such that a retention time period was approximately 600 seconds (the cross-linking step). Thereafter, after cleaning for 4 seconds with aqua pura at 10° C., each of end portions of this film was slit at a position distant by 1.5 cm from the end to thereby remove a curled portion in each of the end portions (the first end portion) (the removal-prior-to-bonding step). Finally, by drying for 300 seconds at 80° C., the stack film roll was obtained.

(6) Bonding Step

With the use of the stack film roll subjected to the removal-prior-to-bonding step, the polarizing plate was fabricated in the following procedure. Initially, polyvinyl alcohol powders ("KL-318" manufactured by Kuraray Corporation, an average degree of polymerization of 1800) were dissolved in hot water at 95° C., to prepare a polyvinyl alcohol aqueous solution having concentration of 3 weight %. A cross-linker ("Sumirez Resin 650" manufactured by Sumitomo Chemicals Co., Ltd.) was mixed in the obtained aqueous solution by 1 part by weight with respect to 2 parts by weight of the polyvinyl alcohol powders, to thereby prepare an adhesive solution.

Then, the adhesive solution above was applied onto the polyvinyl alcohol based resin layer present on each of the opposing surfaces of the obtained stack film roll, and thereafter a protection film composed of triacetylcellulose (TAC) ("KC4UY" manufactured by Konica Minolta Optics, Inc.) was bonded to each of the opposing surfaces, to thereby obtain a polarizing plate roll formed of 9 layers of the protection film/the adhesive layer/the polarizer layer/the primer layer/the base film/the primer layer/the polarizer layer/the adhesive layer/the protection film. The obtained polarizing plate was free from such defects as creases, wrinkles, and blue stain in the end portion of the polarizer and it was in such a good state that good adhesion as far as the end portion of the polarizer was achieved.

Example 2

A polyester base obtained by copolymerizing three types of monomers of 1,4-cyclohexanedimethanol, terephthalic acid, and ethylene glycol was employed as a base. A thickness of the base film was 70 μm. The primer layer and the polyvinyl alcohol based resin layer were provided by using a method the same as in Example 1 to create a stack film constituted of "the polyvinyl alcohol based resin layer/the primer layer/the base film/the primer layer/the polyvinyl alcohol based resin layer" (the stacking step). A thickness of the primer layer was 0.2 μm and a thickness of the polyvinyl alcohol based resin layer was 10.4 μm. Here again, a polyvinyl alcohol aqueous solution was not applied in a region at each of opposing ends which extended by 1 cm from an end of the base film (a third end portion).

Each region in the both ends (second end portions) which extended by 2 cm from the end of the stack film roll above was removed (the removal-prior-to-dyeing step). Thereafter, with the use of a roll midair drawing apparatus, free-end uniaxial drawing at a ratio of 4.0 was carried out in a vertical direction at a drawing temperature of 110° C. (the drawing step) to thereby obtain a stack film roll. A thickness of the obtained stack film was 40.5μm, and a thickness of the polyvinyl alcohol based resin layer was 5.2 μm.

The obtained stack film was subjected to the dyeing step as in Example 1 and cleaned, and then a region at each of the ends which extended by 2 cm from an end of the stack film (the first end portion) was continuously removed by slitting (the removal-prior-to-bonding step). Thereafter, the stack film was obtained by drying with a method the same as in Example 1. The protection film was bonded to each of the opposing surfaces of the obtained stack film with a method the same as in Example 1 (the bonding step), to thereby obtain a polarizing plate roll formed of 9 layers of the protection film/the adhesive layer/the polarizer layer/the primer layer/the base film/the primer layer/the polarizer layer/the adhesive layer/the protection film. The obtained polarizing plate was free from such defects as creases, wrinkles, and blue stain in the end portion of the polarizer and it was in such a good state that good adhesion as far as the end portion of the polarizer was achieved.

Example 3

Though the stack film roll as in Example 2 was used, it was used without the both end portions being removed before drawing (without performing the removal-prior-to-dyeing step). With the use of a roll midair drawing apparatus, free-end uniaxial drawing at a ratio of 4.0 was carried out in a vertical direction at a drawing temperature of 110° C. (the drawing step) to thereby obtain a vertically drawn stack film roll. Since a draw ratio is low, no such defect as fracture was caused in particular, and the roll could be wound up as it was. The obtained stack film was subjected to the dyeing step as in Example 1 and cleaned, and then a region at each of the ends which extended by 2cm from an end of the stack film (the first end portion) was continuously removed by slitting (the removal-prior-to-bonding step).

Thereafter, the stack film was obtained by drying with a method the same as in Example 1. The protection film was bonded to each of the opposing surfaces of the obtained stack film with a method the same as in Example 1 (the bonding step), to thereby obtain a polarizing plate roll formed of 9 layers of the protection film/the adhesive layer/the polarizer layer/the primer layer/the base film/the primer layer/the polarizer layer/the adhesive layer/the protection film. The obtained polarizing plate was free from such defects as creases, wrinkles, and blue stain in the end portion of the polarizer and it was in such a good state that good adhesion as far as the end portion of the polarizer was achieved.

Comparative Example 1

A polarizing plate roll formed of 9 layers of the protection film/the adhesive layer/the polarizer layer/the primer layer/the base film/the primer layer/the polarizer layer/the adhesive layer/the protection film was obtained as in Example 1, except for not performing the removal-prior-to-bonding step. In the obtained polarizing plate roll, an adhesive was accumulated in a portion into which film chips produced from the end portion were bitten, slight blue stain was caused, and wrinkles were also caused by distortion in the end portion, which partially occurred in a cross-linking bath.

Comparative Example 2

A polarizing plate roll formed of 9 layers of the protection film/the adhesive layer/the polarizer layer/the primer layer/the base film/the primer layer/the polarizer layer/the adhesive layer/the protection film was obtained as in Example 2, except for not performing the removal-prior-to-bonding step. In the obtained polarizing plate roll, an adhesive was accumulated in a portion into which film chips produced from the end portion were bitten, slight blue stain was caused, and wrinkles were also caused by distortion at the end portion, which partially occurred in a cross-linking bath.

Comparative Example 3

A polarizing plate roll formed of 9 layers of the protection film/the adhesive layer/the polarizer layer/the primer layer/the base film/the primer layer/the polarizer layer/the adhesive layer/the protection film was obtained as in Comparative Example 2, except for not performing a removal-prior-to-dyeing step. In the obtained polarizing plate roll, an adhesive was accumulated in a step at a boundary between an applied portion and an unapplied portion (a third end portion), many blue stains were caused, and many wrinkles and creases were caused by distortion like a ribbon in the unapplied portion that had been caused during drawing.

Table 1 summarizes outlines of each manufacturing method in Examples 1 to 3 and Comparative Examples 1 to 3 and states of the end portion after bonding.

TABLE 1

|  | Base | Draw Ratio | Presence of Removal-Prior-to-Dyeing Step | Presence of Removal-Prior-to-Bonding Step | State of End portion After Bonding |
|---|---|---|---|---|---|
| Example 1 | Multi-layered PP | ×5.8 | Yes | Yes | Good |
| Example 2 | Polyester-based | ×4.0 | Yes | Yes | Good |
| Example 3 | Polyester-based | ×4.0 | No | Yes | Good |
| Comparative Example 1 | Multi-layered PP | ×5.8 | Yes | No | Slight blue stain Wrinkles partially observed |
| Comparative Example 2 | Polyester-based | ×4.0 | Yes | No | Slight blue stain Wrinkles partially observed |
| Comparative Example 3 | Polyester-based | ×4.0 | No | No | Many wrinkles, creases, and blue stains observed |

INDUSTRIAL APPLICABILITY

A polarizing plate manufactured with the manufacturing method according to the present invention can effectively be applied to various display devices represented by a liquid crystal display device.

REFERENCE SIGNS LIST 11, 21, 31 base film; 12a, 22a, 32a resin layer; 12b, 22b, 32b polarizer layer; 13, 23, 33 first end portion; 34 second end portion; and 21a, 31a third end portion.

The invention claimed is

1. A method of manufacturing a polarizing plate having a polarizer layer and a protection film, the method comprising in this order:
    a stacking step of obtaining a stack film by forming a polyvinyl alcohol based resin layer on at least one surface of a base film;
    a drawing step of uniaxially drawing said stack film;
    a dyeing step of dyeing said polyvinyl alcohol based resin layer of uniaxially drawn said stack film with a dichromatic dye;
    a cross-linking step of forming a polarizer layer by immersing said polyvinyl alcohol based resin layer of dyed said stack film in a solution containing a cross-linker for cross-linking;
    a removal-prior-to-bonding step of cutting and removing, from said stack film having been cross-linked, its both first end portions located on opposite sides across its width; and
    a bonding step of bonding a protection film to a surface of said polarizer layer in said stack film from which the first end portions have been removed, the surface being opposite from the base film; wherein
    in said stacking step, a third end portion where said polyvinyl alcohol based resin layer is not formed is provided at both end portions located on opposite sides across the width of said base film; wherein the third end portion is provided in a region inside by not shorter than 0.5 cm and not longer than 20 cm from each of the both end portions located on opposite sides across the width of the base film.

2. The method according to claim 1, comprising a removal-prior-to-dyeing step of cutting and removing, from said stack film, its both second end portions located on opposite sides across its width, after said stacking step and before said dyeing step.

3. The method according to claim 1, comprising a drying step of drying said polarizer layer after said cross-linking step and before said removal-prior-to-bonding step.

4. The method according to claim 1, comprising a drying step of drying said polarizer layer after said removal-prior-to-bonding step and before said bonding step.

\* \* \* \* \*